Patented Oct. 4, 1927.

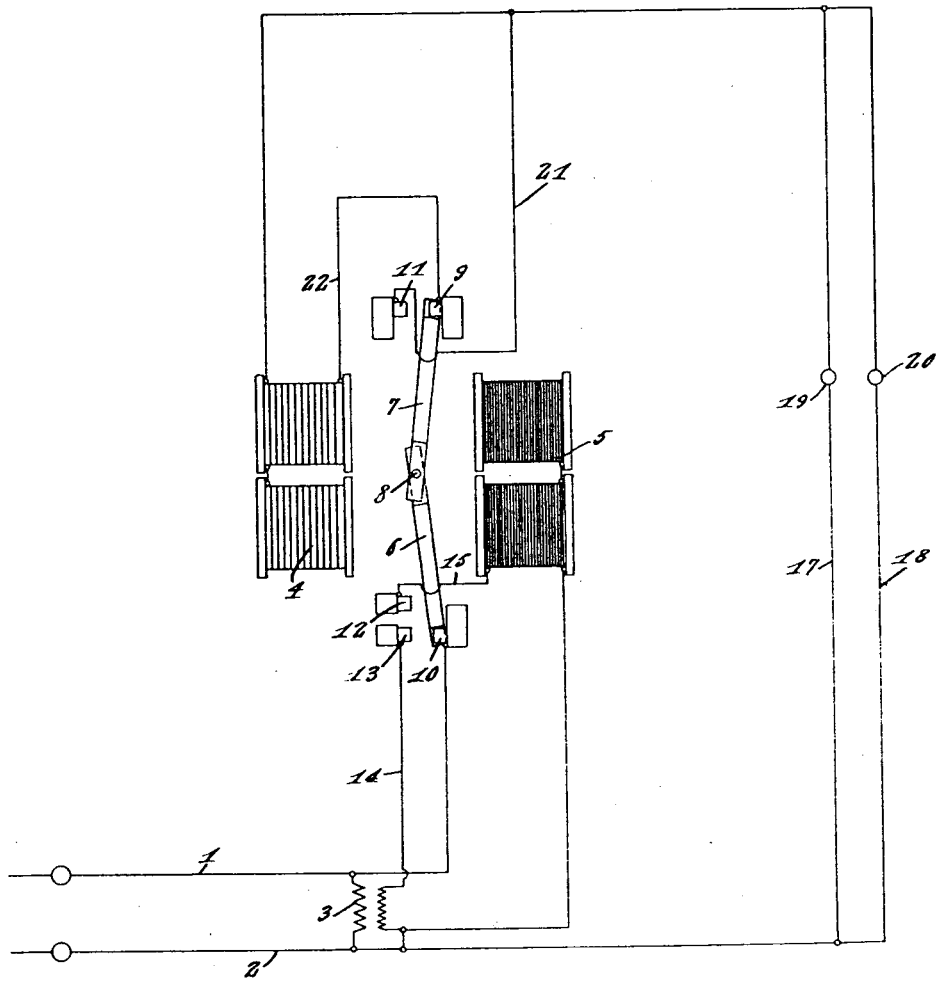

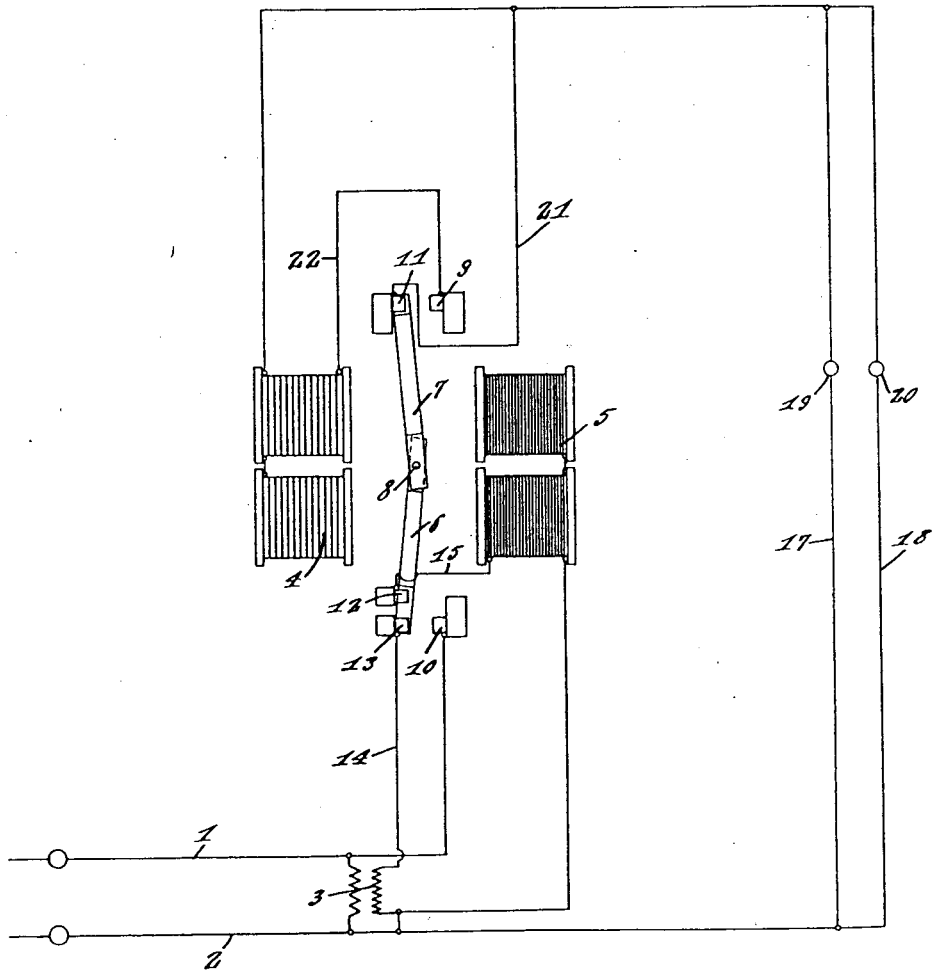

1,644,527

UNITED STATES PATENT OFFICE.

WILLARD E. HOYLER, OF BUFFALO, NEW YORK.

CIRCUIT-PROTECTING SYSTEM.

Application filed October 17, 1925. Serial No. 63,166.

This invention relates to a circuit protecting system, and has for its object to provide, in a manner as hereinafter set forth, a system of such class for controlling overloading and short circuiting and further for eliminating the burning out and changing of burned fuses as well as preventing the burning of current carrying conductors when the line is overloaded or shorted.

A current protecting system, in accordance with this invention, is designed primarily to eliminate the trouble of changing burned fuses, as the system will give the circuit the same protection as that obtained from a fuse, i. e., turn off the current when an overload or short circuit occurs.

In the circuits now used for house wiring or running motors in factories, etc., if an overload or short circuit in the line occurs, an excess amount of current flows and if it is not cut off immediately the wires of the house, motors, etc., become red hot and melt. A fuse interposed in the circuit will melt first, however, before such wires, and this shuts off the current. Then it is necessary to go to the meter board or cutout box and replace the burned out fuse with a new one, and if the overload or short circuit is not removed from the line the newly installed fuse will blow out immediately, and if the cover of the fuse is not tight, the flame from the fuse blowing will injure the party putting the fuse in. This has often happened to experienced persons who place a new fuse in position.

A system in accordance with this invention, interposed in the line, will shut off the current when the line is overloaded or shorted, then will turn the current back on when the overload or short is removed. This operation is accomplished automatically and no one is required to expose himself to the danger or inconvenience of going to the meter board or cutout box to position a new fuse. The system will be a great help to the housewife who uses current for many operations day and night. In factories where electric power is used, the system will cut off the current when a machine is overloaded or shorted and all the operator has to do is to turn off the power and the system will turn the current on again. This saves the operator a trip to the meter board or cutout box and further saves him to exposure of high pressure currents.

This system can also be used on automobiles as a cutout to save the electric bulbs from blowing out, when an excess current comes from the generator through a faulty ground wire. It will also save the wiring system from damage of an overload or shaft wire shorting.

The system can be used on a generator to cut out an excess current from the line and restore the main line switch when the current is again normal. The system has many other usages but all on the same principle for cutting off current from circuit when the circuit is overloaded or shorted, and then restoring the circuit to normal.

Further objects of the invention are to provide, a current protecting system, in a manner as hereinafter set forth and which is simple in its construction and arrangement, durable, compact, thoroughly efficient in its use, readily installed, and comparatively inexpensive to set up.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a diagrammatic view illustrating a circuit protecting system, in accordance with this invention, and when the circuit is in normal position.

Figure 2 is a view similar to Figure 1 with the system illustrated in position when cutting off the heavy current and sending a feeble current to the short or overload in the main line circuit.

Referring to the drawings in detail, 1 and 2 denote the main line wires, and 3 a transformer.

A pair of solenoid magnets are included in the system, and one is indicated at 4 and the other at 5. The solenoid magnet 4 is wound with few coils of heavy wire, according to the voltage used so that opposite poles are north and south. The solenoid magnet 5 is wound with hundreds of coils of fine wire, according to the voltage used so as to form north and south poles. A pair of blades 6, 7 pivotally connected at their inner ends, as at 8, and which cooperate with the contacts 9, 10, 11, 12 and 13 and are shifted through the medium of the solenoid magnets 4, 5. The blade 6 simultaneously engages with the contacts 12, 13.

The line wire 1 leads to the contact 10. A branch 14 leads from the contact 13 to one side of the solenoid 5 and it is in circuit with the line wire 2 and transformer 3. A branch 15 leads from the contact 12 to the same side of the solenoid magnet 5. Branches 17 and 18 lead to the line 2 and are provided with lamps or other devices 19, 20 respectively. The branch 18 extends from one side of the solenoid magnet 4 to the line 2. The branch 17 extends from the branch 18 to the main line wire 2. A branch 21 extends from the contact 11 to the branch 18. A branch 22 leads from that side of the solenoid magnet 4 with which is connected a branch 18 to the contact 9.

The manner in which the system protects the circuit formed by the main line is as follows:—

The path of current when the load is normal is through line 1, contact 10, blades 6 and 7, contact 9, branch 22, solenoid magnet 4, branches 18 and 19, main line 2.

The path of the current when short or overload occurs is changed, due to the fact that the solenoid magnet 4 becomes strong and shifts the blades 6, 7, to engage contacts 11, 12 and 13, which breaks the circuit and the transformer cuts the current down to a feeble amount, and the feeble current can pass through the blades 6, 7, and then through the solenoid magnet 5 to return line or through short circuit or overload to return line. As the solenoid magnet 5 is wound with many turns of fine wire, it offers high resistance to feeble current so current goes through short circuit or overload. The solenoid magnet 4 is dead and magnet 5 substantially dead while short circuit or overload remains in line. When short circuit or overload is removed, the feeble current from the transformer 3 travels through blades 6 and 7 to solenoid magnet 5 to return line, and as solenoid magnet 5 has less resistance than normal load, solenoid magnet 5 becomes energized and shifts the blades 6 and 7 to the position shown in Figure 1.

A circuit protecting system, as aforesaid, controls overloading and short circuiting in the main line circuit and further eliminates the burning out and changing of burned fuses, as well as preventing burning of current carrying conductors when the line is overloaded or shorted, and it is thought that the many advantages of a system in accordance with this invention, can be readily understood, and although the preferred embodiment of the invention is as illustrated and described, yet it is to be understood that changes in the details of construction can be had which will fall within the scope of the invention as claimed.

What I claim is:—

1. A protecting system for a main line circuit when shorted or overloaded comprising a transformer substantially free of affectation from the load and a magnetic switch including an opening and a closing coil, said transformer and switch providing means for interposition in the main line circuit for cutting off the heavy current in the main line circuit when overloaded or shorted and sending a feeble current to the short or overload until the latter is removed, and further for passing a feeble current of a value through said closing coil, when the overloaded short is removed, to close said switch to restore the main line circuit to normal condition, said feeble currents not acting on said switch when opened or closed during a short or overload, and said main line switch held closed during the normal period of the line without utilizing current to hold said switch in such position.

2. A protecting system for a main line circuit when shorted or overloaded comprising a transformer and a switching device including a pair of solenoid magnets, one of comparatively low resistance and the other of comparatively high resistance, said transformer and device providing means for interposition in the main line circuit for cutting off the heavy current in the main line circuit when overloaded or shorted and sending a feeble current to the short or overload until the latter is removed, and further for passing a feeble current of a value through the magnet of high resistance, when the overload or short is removed, to close said device to restore the main line circuit to normal condition, said means so arranged that no movement of said device occurs if power is shut off during a short or overload period and no movement occurs if power is shut off when the line is normal.

3. A protecting system for a main line circuit when shorted or overloaded comprising a transformer and a magnetic switch including an opening and a closing coil, said transformer and switch providing means for interposition in the main line circuit for cutting off a heavy current in the main line circuit when overloaded or shorted and sending a feeble current to the short or overload until the latter is removed, and further for passing a feeble current of a value to said closing coil, when the overload or short is removed, to close said switch and restore the main line circuit to normal condition, the primary of said transformer being connected directly across the line and substantially independent of the load, the secondary current of said transformer going through short or overload and passing through the switch until overload or short is removed from the line.

In testimony whereof, I affix my signature hereto.

WILLARD E. HOYLER.